(12) United States Patent
Anderson et al.

(10) Patent No.: US 10,351,744 B2
(45) Date of Patent: Jul. 16, 2019

(54) ERGONOMIC ADHESIVE NOODLE APPLICATOR

(71) Applicant: The Boeing Company, Chicago, IL (US)

(72) Inventors: Eric C. Anderson, North Charleston, SC (US); Sarah C. Leung, Charleston, SC (US); Carolyn L. Kupper, Summerville, SC (US); Damien Stafford, Georgetown, SC (US)

(73) Assignee: The Boeing Company, Chicago, IL (US)

( * ) Notice: Subject to any disclaimer, the term of this patent is extended or adjusted under 35 U.S.C. 154(b) by 338 days.

(21) Appl. No.: 15/401,167

(22) Filed: Jan. 9, 2017

(65) Prior Publication Data

US 2018/0194971 A1 Jul. 12, 2018

(51) Int. Cl.
*C09J 5/00* (2006.01)
*C09J 201/00* (2006.01)
*B64F 5/00* (2017.01)

(52) U.S. Cl.
CPC ............... *C09J 201/00* (2013.01); *B64F 5/00* (2013.01)

(58) Field of Classification Search
CPC ...... B64F 5/00; C09J 201/00; B65H 35/0026; B65H 35/0033; B65H 37/005; B65H 37/02
See application file for complete search history.

(56) References Cited

U.S. PATENT DOCUMENTS

| | | | |
|---|---|---|---|
| 5,269,871 A * | 12/1993 | Longworth | ........ B65H 35/0033 156/527 |
| 7,201,201 B2 | 4/2007 | Grenier | |
| 2007/0051474 A1* | 3/2007 | Grenier | ................... B44D 3/00 156/577 |
| 2007/0158030 A1* | 7/2007 | Kyriacou | ........... B65H 35/0026 156/577 |

* cited by examiner

*Primary Examiner* — Vishal I Patel
(74) *Attorney, Agent, or Firm* — Ostrager Chong Flaherty & Broitman P.C.

(57) ABSTRACT

Apparatus and methods for manually applying flexible noodles (e.g., noodles made of adhesive material) to a workpiece (e.g., a composite part) during production or construction. The noodle is fed out over a series of upright rolls and rollers to the target area. Those rolls and rollers are rotatably coupled to a platform that is designed to be worn on the forearm of the operator. In accordance with one example, the noodle applicator comprising an ergonomic handle and an ergonomic forearm brace that are positioned and attached to the platform to allow the weight of the platform to be centered higher up the forearm, protecting the wrist. The direction of application is in-line with the forearm of the operator, decreasing the strain involved.

18 Claims, 6 Drawing Sheets

ERGONOMIC ADHESIVE NOODLE APPLICATOR

BACKGROUND

This disclosure generally relates to apparatus and methods for applying long noodles of material to a workpiece during production or construction. In particular, this disclosure relates to apparatus and methods for manually applying adhesive (or fiber-reinforced adhesive) in the form of a flexible noodle.

In general, the majority of the injuries that occur in the manufacturing of large products such as vehicles, aircraft, and the like are associated with exposure to ergonomic risk factors. Epidemiologic research shows that prolonged exposures to such risks are causal factors that contribute to the onset of work-related musculoskeletal disorders.

One operation that may occur during the manufacture of aircraft using composite materials is the placement of a flexible noodle made of adhesive or fiber-reinforced adhesive between composite laminate preforms. For example, it is known to apply a noodle along a surface of a composite skin at a location where a composite stringer will be joined to the composite skin, the noodle being designed to fill a space between the composite skin and the webs of the composite stringer.

One known method for applying a noodle involves the following steps: (1) the noodle arrives at a station in a several-foot-long section; (2) a human operator removes all backing; (3) the operator drapes the noodle over his/her shoulder; (4) the operator applies a heat gun to a section of the workpiece where the starting portion of the noodle will be applied; (5) the operator presses the starting portion of the noodle into place at the heated section with his/her fingers; and (6) the operator moves the heat gun to the next section of the workpiece and repeats the process for the next portion of the noodle.

The challenges that an operator faces in terms of grasping a noodle of material and applying the desired force to the workpiece during noodle application may sometimes be compounded by the repetitive motion incurred as the operator presses successive portions of the noodle across a workpiece. Additionally, the operator may be forced to assume a relatively uncomfortable pose while handling the noodle since the workpiece may be relatively large and may require the operator to reach across at least a portion of the workpiece in order to properly lay down the noodle along the workpiece. In addition, the noodle application solution involving draping a length of material across the back of the human operator has the potential to produce foreign object damage (FOD) in the workpiece. Also the application rate may be slower than desired, resulting in excessive manufacturing time.

It would be desirable to design and construct an apparatus for rolling out a long noodle of material (e.g., adhesive material) in an efficient and ergonomic way to a target area.

SUMMARY

This disclosure is directed to apparatus and methods for manually applying flexible noodles (e.g., noodles made of adhesive material) to a workpiece (e.g., a composite part) during production or construction. The noodle is fed out over a series of upright rolls and rollers to the target area. Those rolls and rollers are rotatably coupled to a platform. The noodle applicator is designed to enable that platform with spools of noodle material to be ergonomically placed with the weight disposed over the forearm of the operator as opposed to over the wrist, resulting in a safer working environment. In accordance with one example, the noodle applicator comprising an ergonomic handle and an ergonomic forearm brace that are positioned and attached to the platform to allow the weight of the platform to be centered higher up the arm, protecting the wrist. The direction of application is in-line with the forearm of the operator, decreasing the strain involved.

The proposed noodle applicator has a pair of upright free-spinning rolls, supported on a platform, that can be used with any type of noodle material if needed. The apparatus is designed to enable adhesive noodle material to be unwound from a first roll and fed out over a second roll and two rollers that forms a pathway for travel of the noodle material (without backing) toward the point of application (also referred to herein as "target area"). The first roll comprises a tube with noodle material and backing wound around the first tube. The backing is removed and then wound onto the second roll as the noodle continues toward the target area.

The apparatus further comprises a tensioner that applies torque on the second roll, causing the backing paper to be wound on the second roll as the noodle is unwound from the first roll, thereby regulating the removal of backing paper from the backside of the paid-out noodle material.

The operator has fine control over the placement of the noodle material as it passes over a precision applicator roller situated at one end of the platform. The precision applicator roller has a groove to hold the noodle material in place. The noodle applicator further comprises a directional guide roller (disposed between the rolls and the precision applicator roller) which redirects the noodle material arriving from the much taller rolls.

The combination of the foregoing features results in a noodle applicator that will potentially increase the speed of noodle application significantly, as well as increase the safety of the operators who do it. Additional aspects of the apparatus and method for applying noodle material to a workpiece will now be described.

One aspect of the subject matter disclosed in detail below is a noodle applicator comprising: a platform having a first end and a second end; a first roll support rotatably coupled to the platform near the second end of the platform; a second roll support rotatably coupled to the platform between the first roll holder and the first end of the platform; a forearm brace coupled to the platform; a handle coupled to the platform at a location between the first end of the platform and the forearm brace; a first roller rotatably mounted at a location near the first end of the platform and having an annular groove in its outer circumferential surface; and a second roller rotatably mounted at a location between the first roller and the second roll support and having first and second flanges. The forearm brace and handle are disposed on one side of the platform, while the first and second roll supports and first and second rollers are disposed on an opposite side of the platform.

The noodle applicator described in the preceding paragraph, when in use, further comprises a first roll seated on the first roll support and a second roll seated on the second roll support, wherein the first roll comprises a first tube and a length of noodle with backing wound around the first tube, and the second roll comprises a second tube. This noodle applicator further comprises: a length of noodle without backing beginning at the second tube, connected to the length of noodle with backing and having a first portion wrapped around a portion of the first roller and a second portion wrapped around a portion of the second roller; and a length of backing wrapped around the second tube. In accordance with some examples, the noodle is made of adhesive material.

In addition, in accordance with some examples, the noodle applicator further comprises: a first pulley fixedly coupled to and coaxial with the first roll; a second pulley fixedly coupled to and coaxial with the second roll; and an endless belt having a first portion wrapped around a portion of the first pulley and a second portion wrapped around a portion of the second pulley.

Another aspect of the subject matter disclosed in detail below is a noodle applicator comprising: a platform; first and second rolls which are rotatable relative to the platform and disposed on one side thereof; first and second pulleys coaxially fixedly coupled to the first and second rolls respectively; an endless belt having a first portion wrapped around a portion of the first pulley and a second portion wrapped around a portion of the second pulley; a forearm brace coupled to the platform and disposed on an opposite side thereof; and a handle coupled to the platform and disposed on the opposite side thereof, wherein the forearm brace and handle are configured to enable the forearm brace to be supported by a forearm of a human operator while the human operator grips the handle with a hand connected to the forearm by a wrist. In accordance with some examples, this noodle applicator further comprises: a first roller which is rotatable relative to the platform and has an outer circumferential surface with an annular groove formed therein; and a second roller which is rotatable relative to the platform and has first and second flanges. In accordance with some examples, the first roll comprises a first tube and a length of noodle with backing wound around the tube, and the second roll comprises a second tube, the noodle applicator further comprising: a length of noodle without backing beginning at the second tube, connected to the length of noodle with backing, and having a first portion wrapped around a portion of the first roller and a second portion wrapped around a portion of the second roller; and a length of backing wrapped around the second tube. In aircraft production, the noodle is typically made of adhesive material.

A further aspect of the subject matter disclosed in detail below is a method for applying a noodle to a workpiece, comprising: (a) unwinding a length of noodle from a roll that is rotatably mounted to a platform; (b) placing an end portion of the length of noodle against a surface of a workpiece; (c) adhering the end portion of the length of noodle to the surface of the workpiece; (d) pressing a roller that is rotatably mounted to the platform against the workpiece while a first portion of the length of noodle is disposed between the roller and the workpiece; (e) rolling the roller on the surface of the workpiece along a second portion of the length of noodle and away from the adhered end portion; and (f) adhering the first portion of the length of the noodle to the surface of the workpiece while the roller remains in contact with the surface of the workpiece. This method may further comprise unwinding an additional portion of the length of the noodle from the roll while the roller is moving during step (e).

Other aspects of apparatus and methods for applying a flexible noodle to a workpiece are disclosed below.

BRIEF DESCRIPTION OF THE DRAWINGS

The features, functions and advantages discussed in the preceding section can be achieved independently in various examples or may be combined in yet other examples.

Various examples will be hereinafter described with reference to drawings for the purpose of illustrating the above-described and other aspects.

Reference will hereinafter be made to the drawings in which similar elements in different drawings bear the same reference numerals.

DETAILED DESCRIPTION

Illustrative examples of apparatus for applying noodles made of adhesive material (with or without fiber reinforcement) are described in some detail below. However, not all features of an actual implementation are described in this specification. After reviewing this disclosure, a person skilled in the art will appreciate that in the development of any such actual example, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
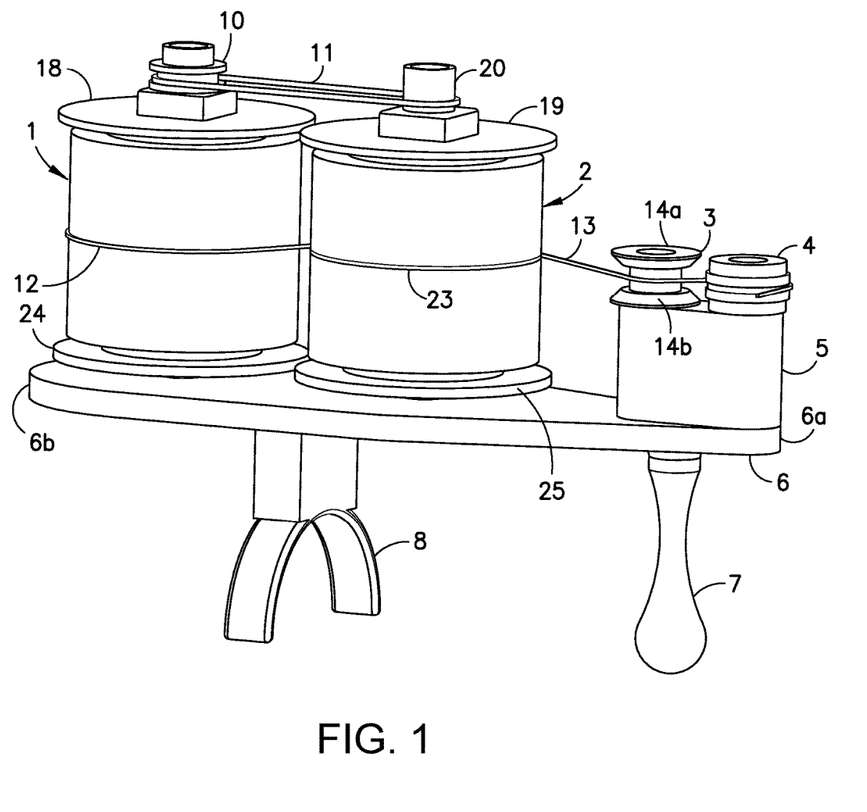
FIG. 1 is a diagram representing an isometric view of a noodle applicator in accordance with one example.

FIG. 1 presents an isometric view of a noodle applicator in accordance with one example. The noodle applicator comprises a platform 6, having a first end 6a and a second end 6b, and a pair of upright free-spinning rolls rotatably mounted to the platform 6. These free-spinning rolls include a combined roll 1 and a backing roll 2. The combined roll 1 is disposed near the second end 6b of the platform 6; the backing roll is disposed between the combined roll 1 and the first end 6a of the platform 6.

Figure 5:
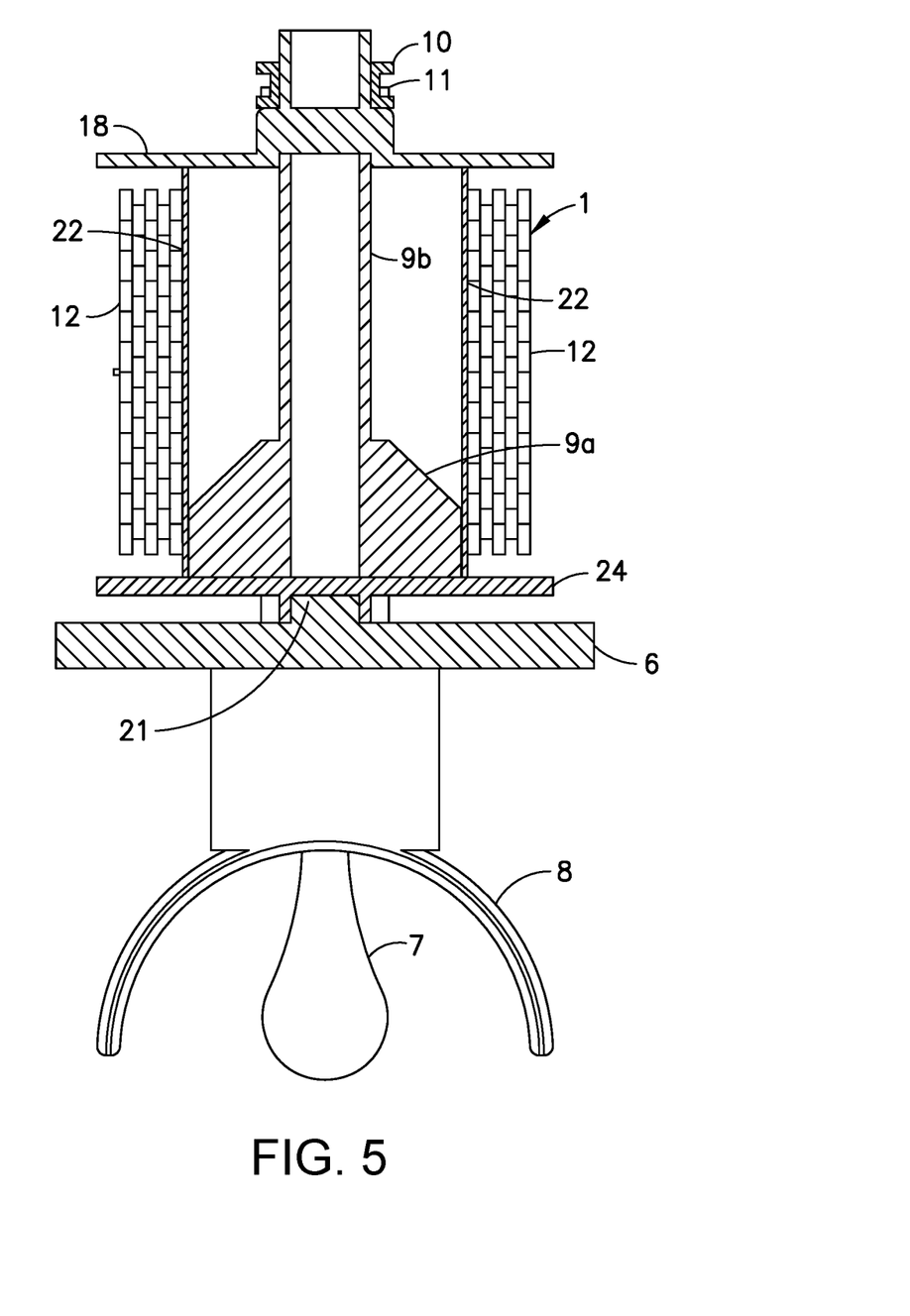
FIG. 5 is a diagram representing a sectional view of a portion of the noodle applicator depicted in FIG. 1, the section being taken along the plane indicated by line 5-5 seen in FIG. 2.

The combined roll 1 comprises a first tube and a length of material 12 comprising a flat noodle 13 with backing 23 on a backside of the noodle, the length of material 12 being wound around the first tube (not visible in FIG. 1, but see tube 22 in FIG. 5). When used in the production of components made of composite material, the noodle 13 may be made of adhesive material (e.g., resin) with or without fiber reinforcement and the backing may be made of paper. As the length of material 12 is paid out from combined roll 1, the backing 23 is separated from the noodle 13 and then wound onto the backing roll 2 as the noodle 13 continues toward its point of application. (To avoid clutter in the drawing, only a single winging of material 12 of combined roll 1 and only a single winding of backing 23 on backing roll 2 are shown in FIG. 1.)

Following separation of the noodle 13 and backing 23, the noodle 13 follows a pathway that includes a noodle segment wrapped around a portion of a directional guide roller 3 and a noodle segment wrapped around a portion of a precision applicator roller 4. The directional guide roller 3 has a pair of beveled flanges 14*a* and 14*b*, which redirect the noodle 13 arriving from the much taller combined roll 1 toward the center of the precision applicator roller 4. The directional guide roller 3 and precision applicator roller 4 are rotatably coupled to an applicator support structure 5, which in turn is fixedly coupled to the portion of platform 6 adjacent to its first end 6*a*. The noodle applicator can be moved by the operator so that the precision applicator roller 4 rolls along the surface of the workpiece along the target area.

Still referring to FIG. 1, the noodle applicator further comprises a forearm brace 8, coupled to the platform 6, that allows the weight of the noodle applicator to be centered higher up the arm of the operator, protecting the operator's wrist, and a handle 7, coupled to the platform 6, that is integrated into the structure at a location such that the operator has fine control over the placement of the noodle 13 on the workpiece as it passes over the precision applicator roller 4.

Figure 2:
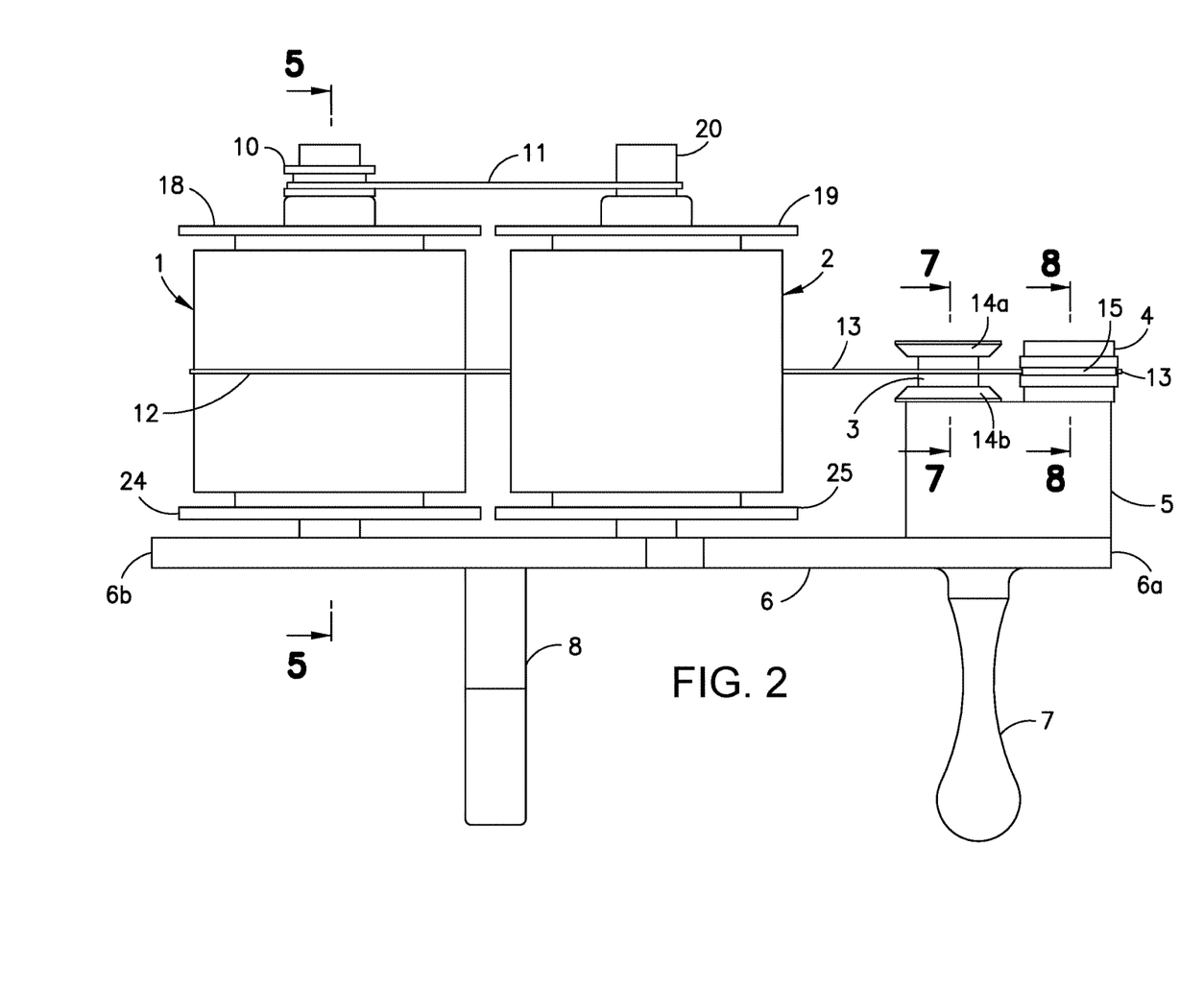
FIG. 2 is a diagram representing a side view of the noodle applicator depicted in FIG. 1.

FIG. 2 presents a side view of the noodle applicator depicted in FIG. 1. As seen in FIG. 2, the forearm brace 8 and handle 7 are disposed on one side of the platform 6, while the combined roll 1, backing roll 2, directional guide roller 3 and precision applicator roller 4 are disposed on the opposite side of the platform 6. In particular, the handle 7 and the applicator support structure 5 are disposed on opposite sides of a portion of the platform 6 adjacent the first end 6*a*. More specifically, when an operator is gripping handle 7 and supporting forearm brace 8, the noodle 13 will lie in a plane above and parallel to the platform 6, which platform is disposed above the operator's forearm. The forearm brace 8 is disposed in a plane that passes between the combined roll 1 and backing roll 2, while the handle 7 is disposed at a location between the first end 6*a* of the platform 6 and the forearm brace 8.

Figure 3:
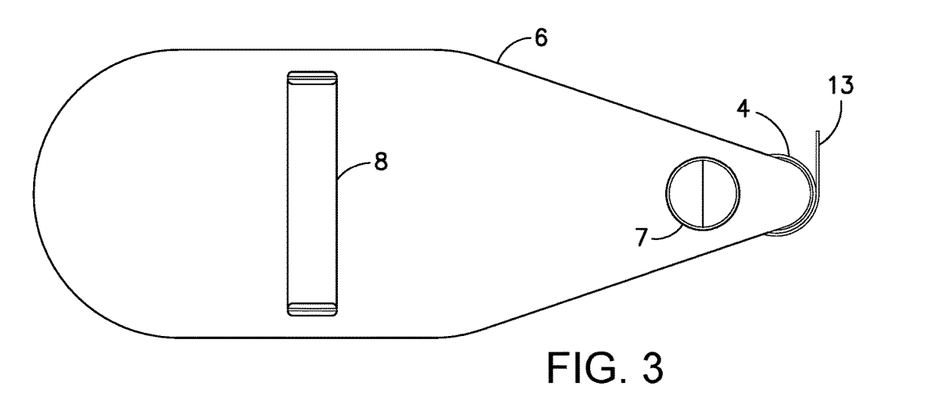
FIG. 3 is a diagram representing a bottom view of the noodle applicator depicted in FIG. 1.
Figure 4:
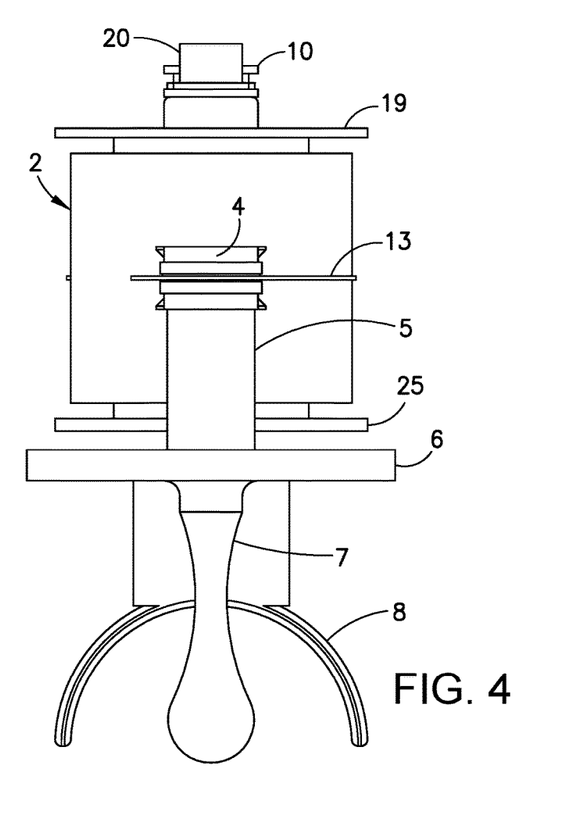
FIG. 4 is a diagram representing an end view of the noodle applicator depicted in FIG. 1.

FIG. 3 presents a bottom view of the noodle applicator depicted in FIG. 2, while FIG. 4 presents an end view. As seen in FIG. 4, the forearm brace 8 comprises a curved lower portion having a generally semi-cylindrical shape, while the handle 7 has an outer surface which is defined by a surface of revolution created by rotating a curve (the generatrix) around an axis of rotation. The radius of the outer surface of handle 7 varies between a minimum radius and a maximum radius, which maximum radius is less than the radius of the curved lower portion of forearm brace 8.

Referring again to FIG. 1, the noodle applicator further comprises a combined roll cap 18 and a combined roll support 24, which rotate in unison with the combined roll 1, and a backing roll cap 19 and a backing roll support 25, which rotate in unison with the backing roll 2. The internal structure of these rotating subassemblies is not visible in FIG. 1, but will now be described with reference to FIG. 5.

FIG. 5 is a diagram representing a sectional view of a portion of the noodle applicator depicted in FIGS. 1 and 2, the section being taken along the plane indicated by line 5-5 seen in FIG. 2. As depicted schematically in FIG. 5, the combined roll 1 comprises a circular cylindrical cardboard tube 22 having a length of material 12, comprising a flat noodle with backing paper on one side, wound on the tube 22. The roll support subassembly for the combined roll 1 comprises the combined roll support 24, a roll aligner 9*a* fixedly coupled to the combined roll support 24, and a central hollow shaft 9*b* integrally formed with and extending upward from roll aligner 9*a*. In the alternative, the combined roll support 24 could be integrally formed with the roll aligner 9*a* or the roll aligner 9*a* and central hollow shaft 9*b* could be separate fixedly coupled elements. The combined roll support 24 is configured to rotate on a trunnion 21 which forms part of the platform 6. The roll aligner 9*a* comprises a lower portion that has a circular cylindrical outer circumferential surface of outer diameter slightly less than the inner diameter of tube 22, so that it fits snugly inside tube 22. During loading of the combined roll 1, the following steps are performed: the combined roll cap 18 is removed from the central hollow shaft 9*b*; the tube 22 is slid onto the lower portion of the roll aligner 9*a* until the bottom edge of tube 22 abuts and sits upon the upper surface of the combined roll support 24; and then the combined roll cap 18 is press fit onto the top of the central hollow shaft 9*b*. In this configuration, the axis of tube 22 is aligned (i.e., coaxial) with the axis of the central hollow shaft 9*b*. The combined roll cap 18 and the combined roll support 24 form opposing flanges that constrain the vertical movement of tube 22.

When fully assembled, the combined roll 1, combined roll support 24, roll aligner 9*a*, central hollow shaft 9*b*, and combined roll cap 18 form a spool that rotates on the upwardly projecting trunnion 21 of platform 6. The roll support subassembly (not shown in the drawings) for the backing roll 2 may have a similar spool configuration designed to rotate on a second trunnion (not shown in the drawings) of platform 6.

Referring again to FIG. 1, the noodle applicator in accordance with one example further comprises a tensioner to apply a torque to the backing roll 2 that regulates the removal of backing 23 from the backside of the paid-out noodle 13. This tensioner comprises a first pulley 10 fixedly coupled to and coaxial with the combined roll cap 18, a second pulley 20 fixedly coupled to and coaxial with the backing roll cap 19, and an endless belt 11 having a first portion wrapped around a portion of the first pulley 10 and a second portion wrapped around a portion of the second pulley 20. As the length of material 12 is paid out from combined roll 1, the combined roll 1 and first pulley 10 will rotate in unison. Preferably the tension in the endless belt 11 is sufficiently high that rotation of the first pulley 10 will produce a torque that causes the second pulley 20 and the backing roll 2 to rotate in unison in the same direction. Provided that the end of the backing 23 has been attached to the backing roll 2 following the initial separation of the end of the backing 23 from the end of the noodle 13, further rotation of backing roll 2 will cause the separated portions of backing 23 (which are being continuously separated from noodle 13) to be wound on the backing roll 2 as payout of material 12 from combined roll 1 continues. The payout of material 12 from combined roll 1 is due to operator movement of the platform 6 in a direction from its first end toward it second end while the already applied section of noodle 13 remains adhered to a stationary workpiece (not shown in FIG. 1).

Figure 6:
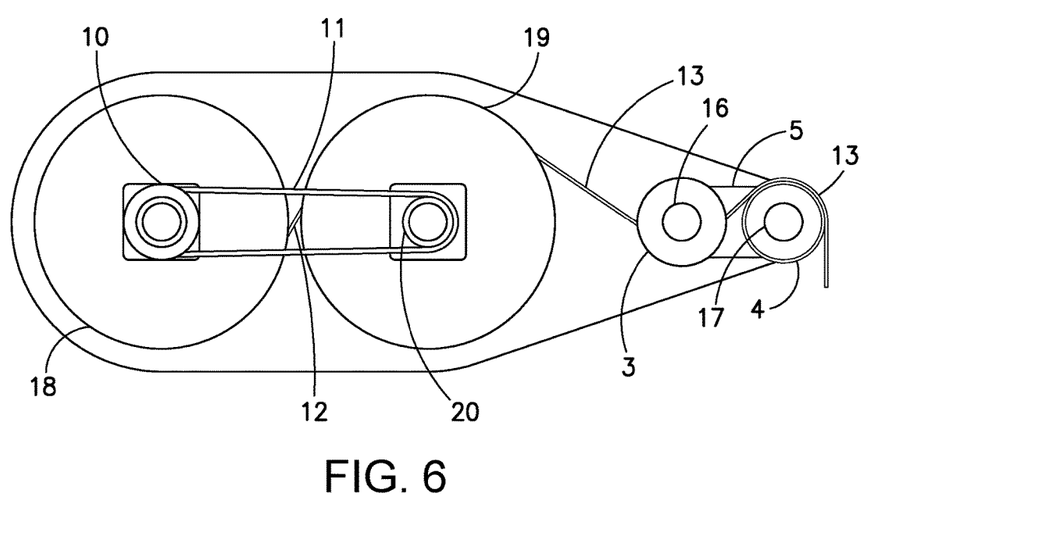
FIG. 6 is a diagram representing a top view of the noodle applicator depicted in FIG. 1.
Figure 7:
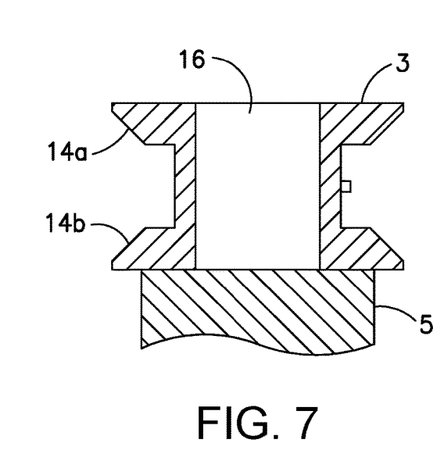
FIG. 7 is a diagram representing a sectional view of a portion of the noodle applicator depicted in FIG. 1, the section being taken along the plane indicated by line 7-7 seen in FIG. 2.
Figure 8:
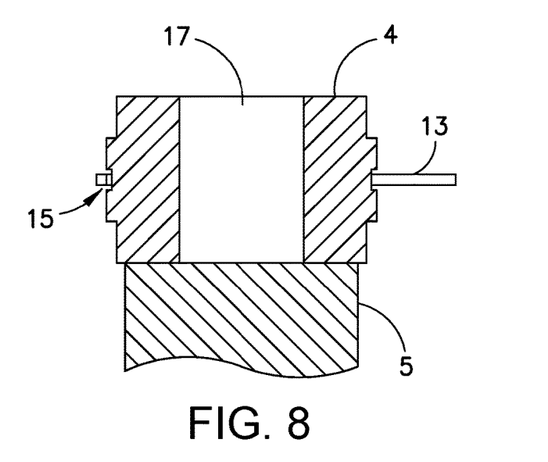
FIG. 8 is a diagram representing a sectional view of a portion of the noodle applicator depicted in FIG. 1, the section being taken along the plane indicated by line 8-8 seen in FIG. 2.

Referring again to FIG. 2, the next segment of noodle 13 to be applied to the workpiece (not shown in FIG. 2) is wrapped around a portion of an annular groove 15 formed in the precision applicator roller 4. Assuming that the top surface of platform 6 is planar (which is not necessary to practice of the concepts disclosed herein), the annular groove 15 will have a fixed elevation relative to that top surface. FIG. 2 shows the particular exemplary case where the next winding of material 12 to be paid out from combined roll 1 and the next segment of noodle 13 to be applied to the workpiece are at the same elevation, namely, the elevation of the annular groove 15 formed in the precision applicator roller 4. However, the next winding of material 12 to be paid out from combined roll 1 may be located at any elevation along the height of the combined roll 1. The purpose of the directional guide roller 3 is to guide noodle 13 from an elevation different than the elevation of the annular groove 15 to an elevation that is the same as of the annular groove 15, i.e., to guide the noodle 13 into annular groove 15 for a range of elevational angles of the segment of noodle 13 that extends from backing roll 2 to directional guide roller 3. To facilitate this purpose, the width of the circular cylindrical portion of directional guide roller 3 that connects the beveled flanges 14*a* and 14*b* is greater than the width of the annular groove 15 formed in the precision applicator roller 4, as shown in FIGS. 7 and 8, which are diagrams representing respective sectional views taken along the planes indicated by lines 7-7 and 8-8 seen in FIG. 2. As seen in FIG. 7, the directional guide roller 3 is rotatably coupled to a shaft 16 projecting upward from the applicator support structure 5. As seen in FIG. 8, the precision applicator roller 4 is rotatably coupled to a shaft 17 projecting upward from the applicator support structure 5. Ideally, the axes of rotation of combined roll 1, backing roll 2, directional guide roller 3 and precision applicator roller 4 are mutually aligned and coplanar (best seen in FIG. 6).

Preferably the width of annular groove 15 is slightly greater than the width of the noodle 13, while the depth of annular groove 15 is equal to about half of the height of the noodle 13 so that it allows the noodle 13 to be pressed directly to the surface of the workpiece but also provides support to the noodle 13 as it is applied. Due to the malleable nature of the noodle, the precision applicator roller 4 will effectively squeeze the noodle 13 as it is pressed to the surface of the workpiece, resulting in surface contact with the outer periphery of the precision applicator roller 4. The widthwise fitting of noodle 13 in the annular groove 15 enables the operator to precisely locate (i.e., control the location of) the next segment of noodle 13 as the precision applicator roller 4 rolls along a surface of the workpiece with one hand while the other hand is used to operate a heating gun that heats the adhesive material of noodle 13, causing it to adhere to the target area.

Figure 9:
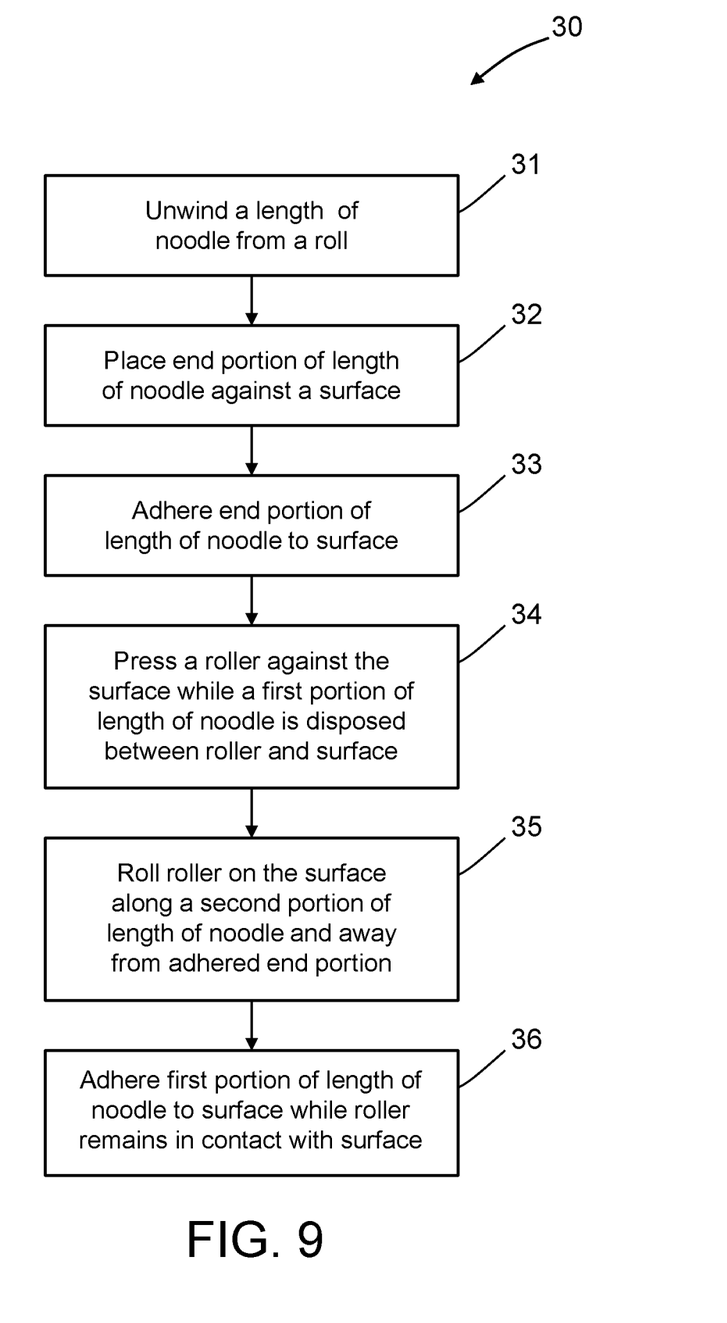
FIG. 9 is a flowchart identifying steps of a method for applying a noodle to a workpiece in accordance with one example.

In accordance with one example, the method 30 (see FIG. 9) for applying a noodle to a workpiece, comprises: (a) unwinding a length of noodle from a roll that is rotatably mounted to a platform (step 31); (b) placing an end portion of the length of noodle against a surface of a workpiece (step 32); (c) adhering the end portion of the length of noodle to the surface of the workpiece (step 33); (d) pressing a roller that is rotatably mounted to the platform against the workpiece while a first portion of the length of noodle is disposed between the roller and the workpiece (step 34); (e) rolling the roller on the surface of the workpiece along a second portion of the length of noodle and away from the adhered end portion (step 35); and (f) adhering the first portion of the length of the noodle to the surface of the workpiece while the roller remains in contact with the surface of the workpiece (step 36). The first portion of the length of noodle is disposed between the end portion and the second portion. This method may further comprise unwinding an additional portion of the length of the noodle from a roll which is rotatably mounted to the platform while the roller is moving during step (e).

In accordance with another example, the method for applying a noodle (e.g., a noodle made of adhesive material) to a workpiece (e.g., a 20-foot-long composite part of an aircraft) comprises: (a) obtaining a roll comprising a noodle wound on a tube; (b) rotatably mounting the roll on one end of a platform that has a roller with an annular groove on another end thereof; (c) placing a brace on a forearm of an operator, which brace is connected to the platform; (d) gripping a handle using the hand at the end of the forearm of the operator, which handle is connected to the platform; (e) unwinding a length of noodle from the roll while the platform is supported on the forearm of the operator; (f) wrapping a first portion of the length of noodle around a portion of the annular groove of the roller; (g) placing an end portion of the length of noodle against a surface of a workpiece, wherein the end portion is connected to the first portion; (h) adhering the end portion of the length of noodle to the surface of the workpiece; (i) moving the operator's arm so that the roller rolls on the surface of the workpiece along the first portion of the length of noodle and away from the adhered end portion; and (j) adhering the first portion to the surface of the workpiece. During step (i), a second portion of the length of the noodle is wrapped around the portion of the annular groove of the roller. In that case, the method further comprises: moving the operator's arm so that the roller rolls on the surface of the workpiece along the second portion of the length of noodle and away from the adhered first portion; and adhering the second portion to the surface of the workpiece. This procedure can be repeated until the noodle has been applied along the entire length of the workpiece or any portion thereof.

All of the elements of the noodle applicator described above (with the exception of the combined and backing rolls) may be made of aluminum. Optionally, the forearm brace, handle and pulleys may be made of aluminum coated with rubber. Other suitable materials can be used.

The solution disclosed above is designed to support heavy rolls of noodle material, which material is then applied to an article by an operator whose arm is extended as the operator walks the length of the article. As the operator walks, he/she presses the noodle into the desired position on the composite part. Because these rolls are heavy, the applicator has a robust platform to hold the rolls, which platform is supported by the operator's arm. This is accomplished by an applicator design in which the operator's forearm supports the applicator platform and in which a handle 7 is provided for the operator to grip during application. Also, because the rolls are relatively tall and the noodle material relatively narrow, the directional guide roller 3 is flanged so that as the noodle/string material is unwound from the roll, it can be accurately guided into the precision applicator roller 4.

While noodle applicators have been described with reference to particular examples, it will be understood by those skilled in the art that various changes may be made and equivalents may be substituted for elements thereof without departing from the scope of the teachings herein. In addition, many modifications may be made to adapt a particular situation to the teachings herein without departing from the essential scope thereof. Therefore it is intended that the claims set forth hereinafter not be limited to the disclosed examples.

As used in the claims, the term "fixedly coupled to" should be construed broadly to encompass any of the following: attached to using fasteners, connected to by an intermediate element, and integrally formed with, the result being two elements which are fixed relative to each other.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A noodle applicator comprising:
   a platform having a first end and a second end;
   a first roll support rotatably coupled to the platform near the second end of the platform;
   a second roll support rotatably coupled to the platform between the first roll support and the first end of the platform;
   a forearm brace coupled to the platform;
   a handle coupled to the platform at a location between the first end of the platform and the forearm brace;
   a first roller rotatably mounted at a location near the first end of the platform and having an annular groove in its outer circumferential surface; and
   a second roller rotatably mounted at a location between the first roller and the second roll support and having first and second flanges.

2. The noodle applicator as recited in claim 1, wherein the forearm brace and handle are disposed on one side of the platform, while the first and second roll supports and first and second rollers are disposed on an opposite side of the platform.

3. The noodle applicator as recited in claim 2, further comprising an applicator support structure fixedly coupled to the platform, the first and second rollers being rotatably coupled to the applicator support structure, wherein the handle and the applicator support structure are disposed on opposite sides of a portion of the platform adjacent the first end.

4. The noodle applicator as recited in claim 1, wherein the platform, first and second roll supports, and first and second rollers are made of aluminum, and the forearm brace and the handle are made of aluminum coated with rubber.

5. The noodle applicator as recited in claim 1, further comprising a first roll seated on the first roll support and a second roll seated on the second roll support, wherein the first roll comprises a first tube and a length of noodle with backing wound around the first tube, and the second roll comprises a second tube.

6. The noodle applicator as recited in claim 5, further comprising:
   a length of noodle without backing beginning at the second tube, connected to the length of noodle with backing and having a first portion wrapped around a portion of the first roller and a second portion wrapped around a portion of the second roller; and
   a length of backing wrapped around the second tube.

7. The noodle applicator as recited in claim 6, wherein the noodle is made of adhesive material.

8. The noodle applicator as recited in claim 5, wherein the first and second tubes are made of cardboard.

9. The noodle applicator as recited in claim 5, further comprising:
   a first pulley fixedly coupled to and coaxial with the first roll;
   a second pulley fixedly coupled to and coaxial with the second roll; and
   an endless belt having a first portion wrapped around a portion of the first pulley and a second portion wrapped around a portion of the second pulley.

10. The noodle applicator as recited in claim 9, wherein the first and second pulleys are made of aluminum coated with rubber.

11. The noodle applicator as recited in claim 9, wherein the axes of rotation of the first and second pulleys and of the first and second rollers are coplanar.

12. A noodle applicator comprising:
    a platform;
    first and second rolls which are rotatable relative to the platform and disposed on one side thereof;
    first and second pulleys coaxially fixedly coupled to the first and second rolls respectively;
    an endless belt having a first portion wrapped around a portion of the first pulley and a second portion wrapped around a portion of the second pulley;
    a forearm brace coupled to the platform and disposed on an opposite side thereof; and
    a handle coupled to the platform and disposed on the opposite side thereof,
    wherein the forearm brace and handle are configured to enable the forearm brace to be supported by a forearm of a human operator while the human operator grips the handle with a hand connected to the forearm by a wrist.

13. The noodle applicator as recited in claim 12, further comprising:
    a first roller which is rotatable relative to the platform and has an outer circumferential surface with an annular groove formed therein; and
    a second roller which is rotatable relative to the platform and has first and second flanges.

14. The noodle applicator as recited in claim 13, further comprising an applicator support structure fixedly coupled to the platform, the first and second rollers being rotatably coupled to the applicator support structure, wherein the handle and the applicator support structure are disposed on opposite sides of a portion of the platform adjacent one end of the platform.

15. The noodle applicator as recited in claim 13, wherein the first roll comprises a first tube and a length of noodle with backing wound around the tube, and the second roll comprises a second tube.

16. The noodle applicator as recited in claim 15, further comprising:
    a length of noodle without backing beginning at the second tube, connected to the length of noodle with backing, and having a first portion wrapped around a portion of the first roller and a second portion wrapped around a portion of the second roller; and
    a length of backing wrapped around the second tube.

17. The noodle applicator as recited in claim 15, wherein the noodle is made of adhesive material.

18. The noodle applicator as recited in claim 13, wherein axes of rotation of the first and second pulleys and of the first and second rollers are coplanar.

* * * * *